United States Patent
Schwie et al.

(10) Patent No.: US 9,915,949 B2
(45) Date of Patent: Mar. 13, 2018

(54) SELF-DRIVING VEHICLE SYSTEMS AND METHODS

(71) Applicants: Wesley Edward Schwie, Minneapolis, MN (US); Eric John Wengreen, Sammamish, WA (US)

(72) Inventors: Wesley Edward Schwie, Minneapolis, MN (US); Eric John Wengreen, Sammamish, WA (US)

( * ) Notice: Subject to any disclaimer, the term of this patent is extended or adjusted under 35 U.S.C. 154(b) by 0 days.

(21) Appl. No.: 15/589,619

(22) Filed: May 8, 2017

(65) Prior Publication Data

US 2017/0357258 A1    Dec. 14, 2017

Related U.S. Application Data

(63) Continuation of application No. 15/181,413, filed on Jun. 14, 2016, now Pat. No. 9,646,356.

(51) Int. Cl.
| | | |
|---|---|---|
| *G05D 1/00* | (2006.01) | |
| *G05D 1/12* | (2006.01) | |
| *B60W 30/06* | (2006.01) | |

(52) U.S. Cl.
CPC ........... *G05D 1/0088* (2013.01); *B60W 30/06* (2013.01); *G05D 1/0022* (2013.01); *G05D 1/12* (2013.01); *G05D 2201/0213* (2013.01)

(58) Field of Classification Search
CPC .... B06Q 50/30; G05D 1/0022; G05D 1/0027; G05D 1/0088; G05D 1/12; G06Q 20/12; G08G 1/202; B60W 30/06
See application file for complete search history.

(56) References Cited

U.S. PATENT DOCUMENTS

| | | |
|---|---|---|
| 5,945,919 A | 8/1999 | Trask |
| 7,698,078 B2 | 4/2010 | Kelty |
| 8,180,379 B2 | 5/2012 | Forstall |
| 8,634,980 B1 | 1/2014 | Urmson |
| 8,700,251 B1 | 4/2014 | Zhu |
| 8,849,494 B1 | 9/2014 | Herbach |
| 8,874,305 B2 | 10/2014 | Dolgov |
| 8,949,016 B1 | 2/2015 | Ferguson |
| 8,954,217 B1 | 2/2015 | Montemerlo |
| 8,954,252 B1 | 2/2015 | Urmson |
| 8,965,621 B1 | 2/2015 | Urmson |
| 8,996,224 B1 | 3/2015 | Herbach |
| 9,008,890 B1 | 4/2015 | Herbach |
| 9,026,300 B2 | 5/2015 | Ferguson |

(Continued)

OTHER PUBLICATIONS

Google Self-Driving Vehicle—Online prior to Apr. 13, 2016 at www.google.com/selfdrivingcar/.

(Continued)

*Primary Examiner* — Thomas G Black
*Assistant Examiner* — Sze-Hon Kong

(57) ABSTRACT

Self-driving vehicles have unlimited potential to learn and predict human behavior and perform actions accordingly. Several embodiments described herein enable a self-driving vehicle to monitor human activity and predict when and where the human will be located and whether the human needs a ride from the self-driving vehicle. Self-driving vehicles will be able to perform such tasks with incredible efficacy and accuracy that will allow self-driving vehicles to proliferate at a much faster rate than would otherwise be the case.

20 Claims, 9 Drawing Sheets

(56) References Cited

U.S. PATENT DOCUMENTS

| | | |
|---|---|---|
| 9,120,484 B1 | 9/2015 | Ferguson |
| 9,120,485 B1 | 9/2015 | Dolgov |
| 9,194,168 B1 | 11/2015 | Lu |
| 9,429,947 B1 | 8/2016 | Wengreen |
| 9,459,622 B2 | 10/2016 | Abhyanker |
| 2009/0287367 A1 | 11/2009 | Salinger |
| 2012/0009845 A1 | 1/2012 | Schmelzer |
| 2012/0083960 A1 | 4/2012 | Zhu |
| 2013/0132140 A1 | 5/2013 | Amin |
| 2013/0197674 A1 | 8/2013 | Lowry |
| 2013/0231824 A1* | 9/2013 | Wilson ............... G05D 1/0246 701/26 |
| 2013/0246301 A1 | 9/2013 | Radhakrishnan |
| 2014/0129951 A1 | 5/2014 | Amin |
| 2014/0316616 A1 | 10/2014 | Kugelmass |
| 2014/0336935 A1 | 11/2014 | Zhu |
| 2014/0350855 A1 | 11/2014 | Vishnuvajhala |
| 2015/0012833 A1 | 1/2015 | Foy |
| 2015/0088421 A1 | 3/2015 | Foster |
| 2015/0199619 A1 | 7/2015 | Ichinose |
| 2015/0271290 A1 | 9/2015 | Tao |
| 2015/0295949 A1 | 10/2015 | Chizeck |
| 2015/0339928 A1* | 11/2015 | Ramanujam ............ G06Q 10/00 701/23 |
| 2015/0346727 A1* | 12/2015 | Ramanujam ....... B62D 15/0285 701/23 |
| 2016/0071056 A1 | 3/2016 | Ellison |
| 2016/0116293 A1* | 4/2016 | Grover ................. G01C 21/34 701/23 |
| 2016/0125735 A1* | 5/2016 | Tuukkanen ............ G08G 1/09 701/23 |
| 2016/0187150 A1* | 6/2016 | Sherman ............ G01C 21/3438 705/7.15 |
| 2016/0209220 A1 | 7/2016 | Laetz |
| 2016/0209843 A1 | 7/2016 | Meuleau |
| 2016/0227193 A1 | 8/2016 | Osterwood |
| 2016/0247106 A1 | 8/2016 | Dalloro |
| 2016/0301698 A1* | 10/2016 | Katara ................. G07B 13/02 |
| 2016/0370194 A1* | 12/2016 | Colijn ................. G01C 21/343 |
| 2017/0024393 A1* | 1/2017 | Choksi ................. G06Q 40/12 |
| 2017/0068245 A1* | 3/2017 | Scofield .............. G08G 1/0112 |
| 2017/0075358 A1* | 3/2017 | Zhang .................. G06Q 10/06 |
| 2017/0132540 A1* | 5/2017 | Haparnas .......... G06Q 10/06311 |
| 2017/0147951 A1* | 5/2017 | Meyer ................... G06Q 10/02 |
| 2017/0147959 A1* | 5/2017 | Sweeney ............. G05D 1/0022 |

OTHER PUBLICATIONS

Tesla Autopilot—Online prior to Apr. 13, 2016 at www.technologyreview.com/s/600772/10-breakthrough-technologies-2016-tesla-autopilot/.
Tesla Model S Software Version 7—Autopilot—Online prior to Apr. 13, 2016 at www.teslamotors.com/presskit/autopilot.
BMW Heads Up Display—Online prior to Apr. 13, 2016 at www.autotrader.com/car-news/full-color-heads-up-display-to-debut-on-new-3-series-132586.
Uber Details—Online prior to Apr. 13, 2016 at www.wikihow.com/Use-Uber.
Raspberry Pi: How can I detect the direction of a sound—Online prior to Apr. 13, 2016 at www.quora.com/Raspberry-Pi-1/How-can-I-detect-the-direction-of-a-sound.
Wikipedia: Biometric Device—Downloaded on Aug. 19, 2016 from en.wikipedia.org/wiki/Biometric_device.
Self-Driving Cars Go Public; Uber Offers Rides in Pittsburgh—Downloaded on Aug. 19, 2016 from www.yahoo.com/news/uber-autonomous-cars-haul-people-125127470.html?ref=gs.
Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.
Zach Epstein, You'll be riding in self-driving cars as soon as next year, May 6, 2016, BGR.com, http://bgr.om/2016105'06/lyfl-self-driving-cars-2017.
Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094.

* cited by examiner

SELF-DRIVING VEHICLE SYSTEMS AND METHODS

CROSS-REFERENCE TO RELATED APPLICATIONS

This application claims the benefit of and is a continuation of U.S. Non-Provisional patent application Ser. No. 15/181,413; filed Jun. 14, 2016; and entitled SELF-DRIVING VEHICLE SYSTEMS AND METHODS. The entire contents of U.S. patent application Ser. No. 15/181,413 are incorporated by reference herein.

The entire contents of the following application are incorporated by reference herein: U.S. Non-Provisional patent application Ser. No. 15/099,565; filed Apr. 14, 2016; and entitled SELF-DRIVING VEHICLE SYSTEMS AND METHODS.

The entire contents of the following application are incorporated by reference herein: U.S. Non-Provisional patent application Ser. No. 15/248,910; filed Aug. 26, 2016; and entitled SELF-DRIVING VEHICLE SYSTEMS AND METHODS.

BACKGROUND

Field

Various embodiments disclosed herein relate to vehicles. Certain embodiments relate to self-driving motorized vehicles.

Description of Related Art

Vehicles typically require a driver. These vehicles often can only perform actions when directly instructed by the driver. However, self-driving vehicles are not reliant upon drivers and can perform actions based upon external events. As such, self-driving vehicles can save time and dramatically increase convenience in roadway travel. As a result, there is a need for systems and methods that enable self-driving vehicles to perform actions based upon external events.

SUMMARY

Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles have unlimited attention spans and can process complex sensor data nearly instantaneously. The ability of self-driving vehicles to save lives is so impressive that society has a moral imperative to develop self-driving technology such that it can be widely adopted.

Self-driving vehicles also have the ability to dramatically save time and improve convenience in roadway travel. Specifically, self-driving vehicles have unlimited potential to learn and predict human behavior and perform actions accordingly. Many embodiments described herein enable a self-driving vehicle to monitor human activity and predict when and where the human will be located and whether the human needs a ride from the self-driving vehicle. Self-driving vehicles will be able to perform such tasks with incredible efficacy and accuracy that will allow self-driving vehicles to proliferate at a much faster rate than would otherwise be the case.

The disclosure includes a method of picking up a person with a self-driving vehicle. The method can comprise receiving, by a vehicle management system, a notification; and sending, by the vehicle management system, a first wireless communication to the self-driving vehicle in response to receiving the notification. The first wireless communication can prompt the self-driving vehicle to move towards the person.

In some embodiments, the notification comprises a checkout notification and the method further comprises receiving, by the vehicle management system, the checkout notification in response to the person purchasing an item at a store. In some embodiments, the person has a remote computing device and receiving the checkout notification can occur in response to the person performing an electronic payment transaction for a purchase of the item at the store. The method can further include searching, by the vehicle management system, for location data of the remote computing device in response to the electronic payment transaction; and sending, by the vehicle management system, the location data of the remote computing device to the self-driving vehicle in response to the electronic payment transaction.

Methods can also comprise searching, by the vehicle management system, for location data of the remote computing device in response to the electronic payment transaction; and determining, by the vehicle management system, whether the remote computing device is located within a predetermined distance of the self-driving vehicle. The first wireless communication can prompt the self-driving vehicle to move towards the person having the remote computing device in response to the remote computing device being located within the predetermined distance.

In some embodiments, the method further comprises sending, by the vehicle management system in response to the remote computing device not being located within the predetermined distance of the self-driving vehicle, a second wireless communication to the remote computing device. The second wireless communication can prompt the remote computing device to determine whether the person wants the self-driving vehicle to move towards the person.

Methods can also include receiving, by the vehicle management system, a third wireless communication in response to the second wireless communication. The third wireless communication can comprise at least one of first instructions to maintain the self-driving vehicle in a parked state and second instructions to move the self-driving vehicle towards the person. Methods can also include sending, by the vehicle management system in response to receiving the third wireless communication, a fourth wireless communication to the remote computing device, wherein the fourth wireless communication prompts the remote computing device to determine where the person wants to meet the self-driving vehicle.

In some embodiments, receiving the checkout notification occurs in response to the person purchasing the item with a credit card. Methods can further include determining, by the vehicle management system, location data of a remote computing device of the person in response to the checkout notification.

In response to receiving the checkout notification, the method can comprise determining, by the vehicle management system, whether the remote computing device is not connected to a cellular network; and maintaining the self-driving vehicle in a parked state in response to determining the remote computing device is not connected to the cellular network. Methods can also include determining, by the vehicle management system, whether the remote computing device was previously not connected to the cellular network and then determining whether the remote computing device is connected to the cellular network; and sending, by the vehicle management system, the first wireless communication to the self-driving vehicle in response to determining whether the remote computing device was previously not connected to the cellular network and then determining whether the remote computing device is connected to the cellular network.

In some embodiments, the method comprises sending, by the vehicle management system in response to receiving the checkout notification, a second wireless communication to a remote computing device of the person, wherein the second wireless communication prompts the remote computing device to determine whether the person wants the self-driving vehicle to move towards the person. Methods can also include receiving, by the vehicle management system, a third wireless communication in response to the second wireless communication, wherein the third wireless communication comprises instructions to maintain the self-driving vehicle in a parked state for a predetermined amount of time.

Additionally, in some embodiments, the method comprises sending, by the vehicle management system in response to receiving the checkout notification, a second wireless communication to a remote computing device of the person, wherein the second wireless communication prompts the remote computing device to determine whether the person wants the self-driving vehicle to move towards the person. Methods can also include receiving, by the vehicle management system, a third wireless communication in response to the second wireless communication, wherein the third wireless communication instructs the vehicle management system to return the self-driving vehicle to a parked state.

The notification can comprise a notification of a first event associated with the person. Accordingly, methods can comprise receiving, by the vehicle management system, a second checkout notification in response to the person purchasing a second item at the store.

Receiving the notification can comprise receiving, by the vehicle management system, a pickup request for the self-driving vehicle to pick up the person; and picking up the person with the self-driving vehicle. In some embodiments, the method includes receiving, by the vehicle management system, location data of a requested location for where the self-driving vehicle should meet the person; and arriving, by the vehicle, at the requested location of the person. Additionally, methods can include determining, by the vehicle management system, a time of arrival of the person at the requested location; and arriving, by the vehicle, at the requested location before the time of arrival of the person.

In some embodiments, the method comprises determining, by the vehicle management system, a first travel time for the vehicle to arrive at the requested location; determining, by the vehicle management system, a second travel time for the person to arrive at the requested location; determining, by the vehicle management system, whether the second travel time is greater than the first travel time; and delaying, by the vehicle, arriving at the requested location in response to determining the second travel time is greater than the first travel time. Delaying arriving at the requested location can comprise delaying arriving at the requested location by an amount of time less than or equal to the difference between the second travel time and the first travel time.

The notification can comprise a logout notification. Accordingly, the method can further comprise receiving, by the vehicle management system, the logout notification in response to the person logging out of a work computer. In some embodiments, the method comprises determining, by the vehicle management system, that the logout notification occurs during a predetermined time of day, and sending, by the vehicle management system, the first wireless communication to the self-driving vehicle occurs in response to receiving the logout notification and the logout notification occurring during the predetermined time of day.

In some embodiments, the method comprises determining, by the vehicle management system, that the person has a scheduled appointment within a predetermined amount of time of the occurrence of the logout notification. Additionally, sending, by the vehicle management system, the first wireless communication to the self-driving vehicle can occur in response to determining whether the person has the scheduled appointment within the predetermined amount of time of the occurrence of the logout notification.

Methods can include determining, by the vehicle management system, whether a remote computing device of the person is located within a predetermined distance of the self-driving vehicle; and sending, by the vehicle management system, the first wireless communication to the self-driving vehicle in response to the remote computing device being located within the predetermined distance of the self-driving vehicle.

The disclosure also includes a method of picking up a person with a self-driving vehicle. The method can comprise determining, by a vehicle management system, whether a remote computing device associated with the person is one of disconnected from the cellular network and connected to the cellular network with a first signal less than a predetermined level; then determining, by the vehicle management system, whether the remote computing device is connected to the cellular network with a second signal greater than or equal to the predetermined level; and sending, by the vehicle management system, a first wireless communication to the self-driving vehicle in response to determining whether the remote computing device is connected to the cellular network with the second signal greater than or equal to the predetermined level.

In some embodiments, the method includes determining, by the vehicle management system, whether the remote computing device is connected to the cellular network with a second signal greater than or equal to the predetermined level occurs during a predetermined time of day. Additionally, sending, by the vehicle management system, the first wireless communication to the self-driving vehicle can occur in response to determining whether the remote computing device is connected to the cellular network with the second signal greater than or equal to the predetermined level occurs during the predetermined time of day.

Methods can even include determining, by the vehicle management system, whether the remote computing device is one of disconnected from the cellular network for at least a predetermined amount of time and connected to the cellular network with the first signal less than the predetermined level for at least the predetermined amount of time. As well, sending, by the vehicle management system, the first wireless communication to the self-driving vehicle can occur in response to determining whether the remote computing device is one of disconnected from the cellular network for at least a predetermined amount of time and connected to the cellular network with the first signal less than the predetermined level for at least the predetermined amount of time.

In some embodiments, the method comprises determining, by the vehicle management system, whether the remote computing device is one of disconnected from the cellular network for less than the predetermined amount of time and connected to the cellular network with the second signal less than the predetermined level for less than the predetermined amount of time. Methods can also include maintaining the vehicle in a parked state in response determining whether the remote computing device is one of disconnected from the cellular network for less than the predetermined amount of time and connected to the cellular network with the second signal less than the predetermined level for less than the predetermined amount of time.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will offer provide significant savings to the economy and society at-large. For example, self-driving vehicles will not only greatly reduce roadway congestion, thus making transportation more efficient and less costly, but self-driving vehicles will also learn and adapt to human behavior, thus providing an unimaginable level of convenience in today's world of transportation. The ability of self-driving vehicles to positively impact the economy and public is so impressive that society has a moral imperative to develop self-driving technology such that it can be widely adopted.

Self-driving vehicles have unlimited potential to learn and predict human behavior and perform actions accordingly. Many embodiments described herein enable a self-driving vehicle to monitor human activity and predict when and where the human will be located and whether the human needs a ride from the self-driving vehicle. Self-driving vehicles will be able to perform such tasks with incredible efficacy and accuracy, which will allow self-driving vehicles to proliferate at a much faster than would otherwise be the case.

Figure 1:
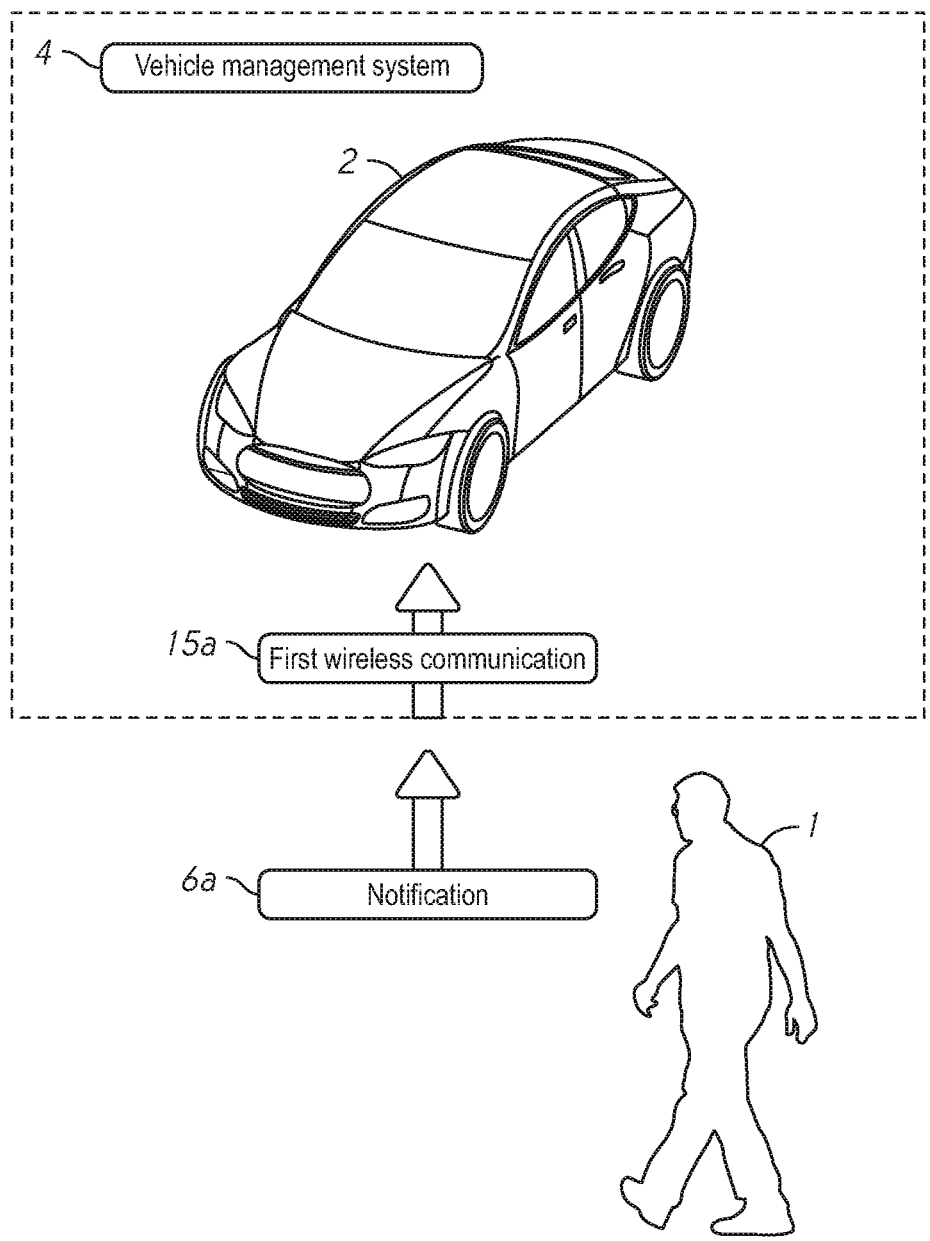
FIG. 1 illustrates a diagrammatic view of a self-driving vehicle, according to some embodiments.

FIG. 1 illustrates a diagrammatic view of a self-driving vehicle 2 ("vehicle") and a vehicle management system 4 ("system"). In some embodiments, the system 4 comprises the vehicle 2. In this regard, the system 4 can comprise a plurality of vehicles (e.g. self-driving vehicles and non self-driving vehicles) that are communicatively coupled to the system 4. In some embodiments, the vehicle 2 comprises the system 4. In this regard, the system 4 can be implemented as an on-board system located within the vehicle 2. In such embodiments, the system 4 can still be communicatively coupled to other vehicles (e.g. self-driving vehicles and non self-driving vehicles).

With continued reference to FIG. 1, the system 4 can receive a notification 6a. In some embodiments, the system 4 can send a first wireless communication 15a to the vehicle 2 in response to the system 4 receiving the notification 6a. The first wireless communication 15a can thereby prompt the vehicle 2 to move towards the person 1. It should be noted that any of the transmission steps described in this disclosure, such as sending, receiving, and the like, can be executed directly and/or indirectly.

Figure 2:
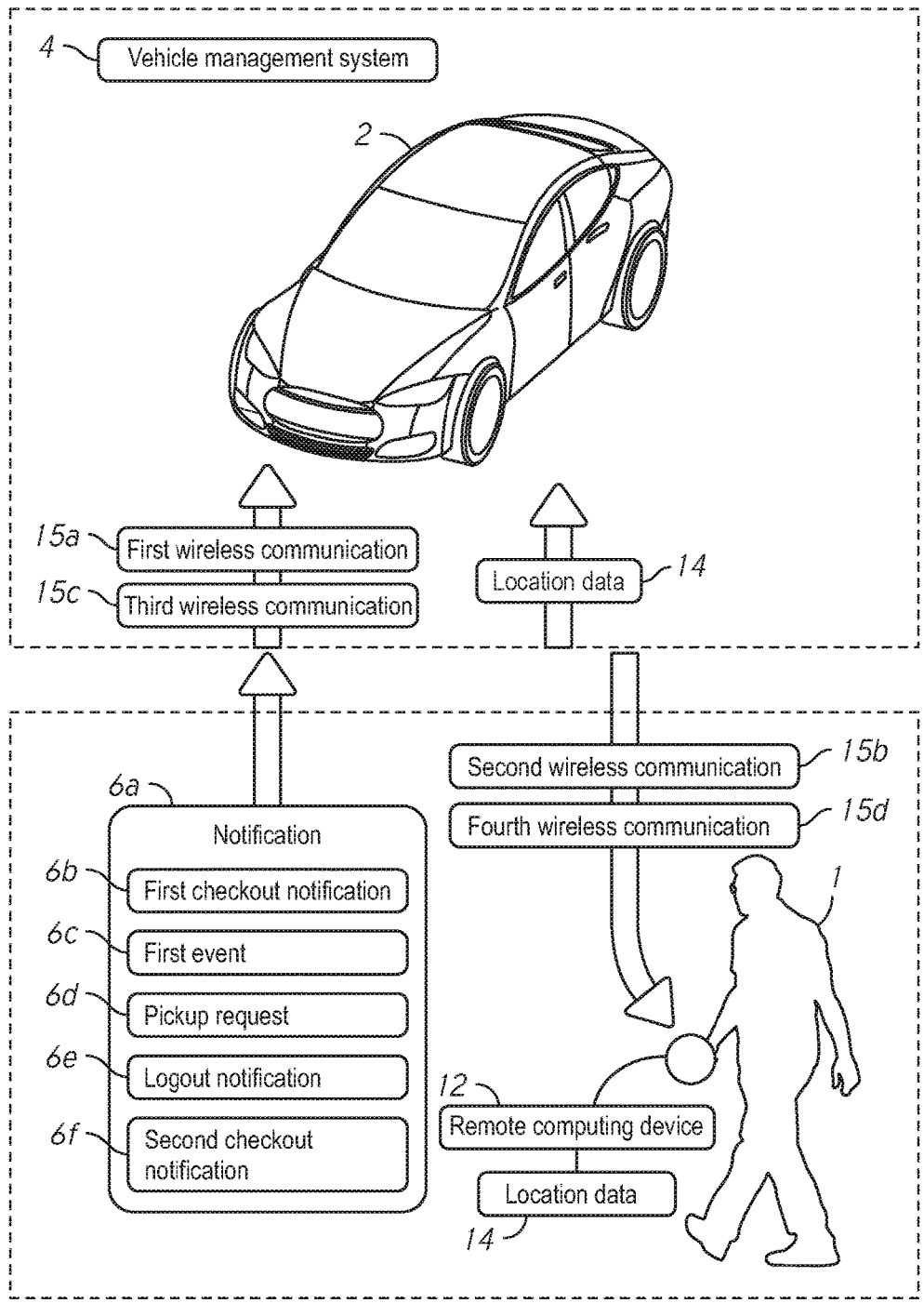
FIG. 2 illustrates a diagrammatic view of a self-driving vehicle, according to some embodiments.

As shown in FIG. 2, the notification 6a can be any type of notification that indicates that a person, such as the person 1 or another person, needs a ride from the vehicle 2. In some embodiments, the notification 6a comprises a checkout notification 6b, such as a notification that the person has purchased an item or service from a store. Accordingly, in some embodiments, the vehicle management system 4 receives the checkout notification 6b in response to the person 1 purchasing the item or service at the store.

Figure 3:
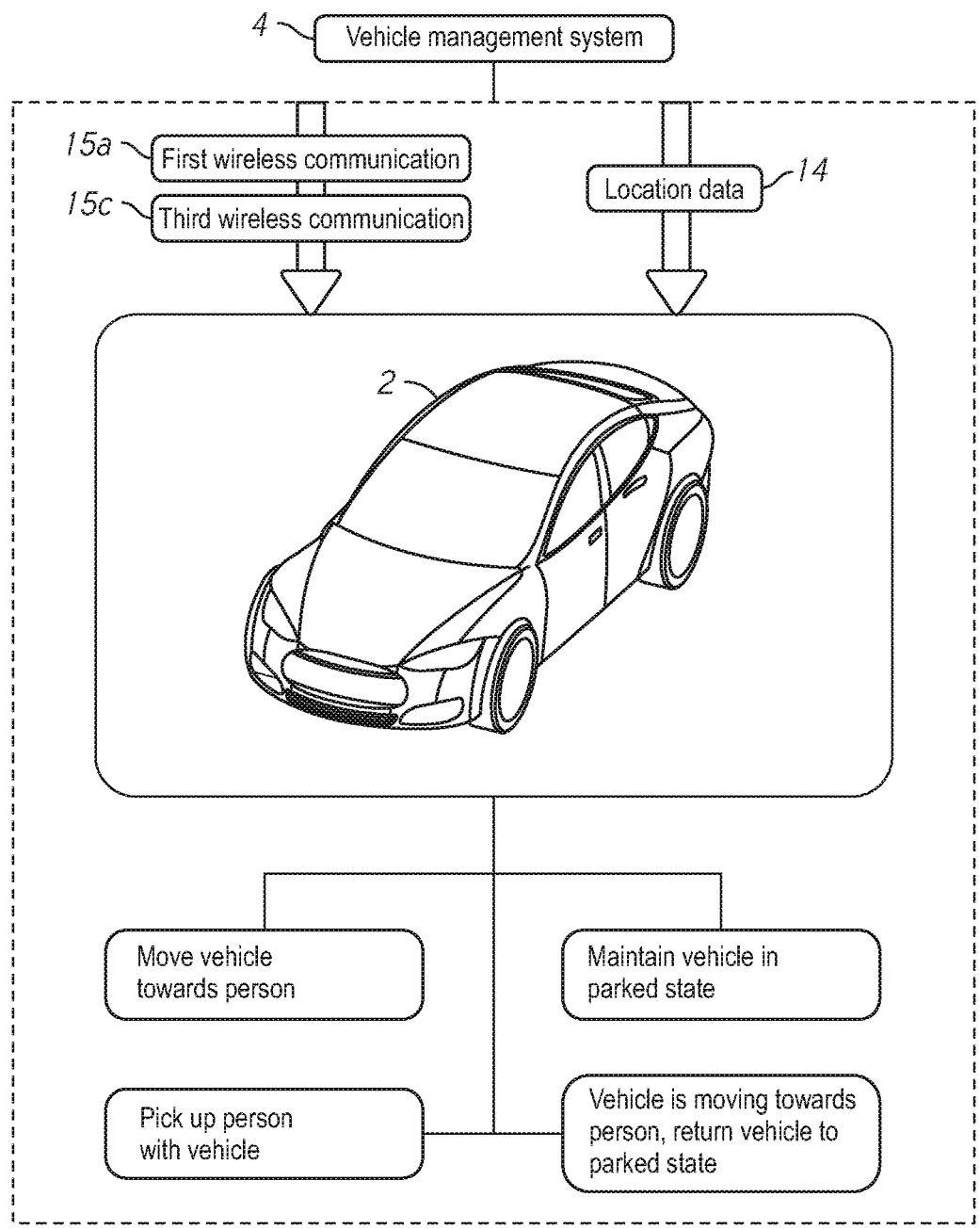
FIG. 3 illustrates a diagrammatic view of a method of using a self-driving vehicle, according to some embodiments.

According to FIGS. 2 and 3, the vehicle 2 and/or system 4 may perform actions in response to the system 4 receiving an indication of the notification 6a. For example, in response to receiving the notification 6a, such as the checkout notification 6b, the system 4 may send a second wireless communication 15b to the remote computing device 12. The second wireless communication 15b may prompt the remote computing device 12 to ask the person 1 whether the person 1 wants the vehicle 2 to move towards the person 1. In this regard, the system 4 can respond to the notification by sending an indication to the remote computing device 12 to determine whether the person 1 wants the vehicle 2 to move towards the person 1 (e.g. pick up the person 1). Because the vehicle 2 and/or system 4 can receive wireless communications while the vehicle 2 is in a parked state or a driving state, such as when the vehicle 2 is in a holding pattern (e.g. driving around the parking lot waiting for the person 1 to be picked up), the system 4 may receive the second wireless communication 15c. In some embodiments, the second wireless communication 15c may instruct the vehicle 2 to move to a parked state, enter the holding pattern, continue the holding pattern, or move towards a pickup location to retrieve the person 1. It should be appreciated that the phrase "parked state" means that the vehicle 2 remains in a stationary position or the vehicle 2 is in a non-pickup mode whereby the vehicle is moving but is not actively en route to pick up the person 1.

As shown in FIG. 2, the notification 6a can comprise various types of notifications and events, such as a first event 6c associated with the person 1. In some embodiments, the first event 6c may comprise a text message or email sent by the remote computing device 12, a post on a social network communicatively coupled to the remote computing device 12, such as status or "check in" posted on a social network (e.g. Facebook®, Twitter®, and the like). The first event 6c may also include other external events, such as a severe weather alert. For example, the system 4 may be configured to determine if severe weather is about to occur. In response to this determination, the vehicle 2 can move towards the person 1 to pick up the person 1 and take them out of harm's way.

The system 4 can also be configured to determine the occurrence of many other events, such as whether an event or appointment that the person is attending 1 has concluded or is about to conclude whereby the event has a known ending time. For example, the system 4 can determine that the person 1 is attending a movie and the movie has ended or is about to end within a predetermined amount of time, such as within 5 minutes.

The system 4 can also be configured to determine whether an event or appointment that the person is attending 1 has concluded or is about to conclude whereby the event has an unknown ending time. Described differently, many appointments and events, such as sporting events, can last for unknown amounts of time. For example, a baseball game may have a tie score whereby the game is extended into extra innings. In this regard, the system 4 can determine that the person 1 is not only attending the baseball game, but the system can determine, via a third party database, whether the game has been extended to extra innings. The system 4 may continue to monitor the progress of the baseball game and once the game is over, the vehicle 2 may be dispatched to retrieve the person 1. The system 4 may further be configured with advanced features, or analytics, to determine the conclusion of the event based upon statistical probabilities. For example, the system 4 may be monitoring the progress of the baseball game and the system 4 may determine that the home team has scored 7 runs in the bottom of the $12^{th}$ inning and that the home team now leads by a score of 8-1. The system 4 may implement statistical analysis and determine that the other team has a very low statistical chance of scoring 7 or more runs during the top of the $13^{th}$ inning. In response to this determination, the vehicle 2 may move towards the person 1 based upon the assumption that the game will end after the top of the $13^{th}$ inning. It should be appreciated that these are just a few of the many examples of how statistical analysis and analytics can be used to predict the end of events with unknown ending times. Accordingly, in response to this analysis, the vehicle 2 and system 4 can respond by performing any appropriate action, as described in this disclosure.

The notification 6a can also include various notifications, such as a second checkout notification 6f. The second checkout notification 6f can indicate that the person 1 has purchased a second item from the same store, or even a different store. This type of notification can indicate that the person 1 is still shopping and may not want to be picked up just yet. Alternatively, this type of notification can indicate that the person 1 has concluded their shopping and is ready to be picked up. The system 4 can learn the person's behavior patterns and respond to future occurrences in accordance with these patterns, which can indicate the person's desires.

In some embodiments, the system 4 receives the checkout notification 6b in response to the person 1 purchasing the item with a credit card. In response to the checkout notification, the vehicle 2 can thereby move towards the person 1. In some embodiments, the system 4 can further determine the location data 14 of the remote computing device 12 of the person in response to the checkout notification (e.g. credit card transaction) and the vehicle 2 can thereby move towards the location of the remote computing device 12. To further illustrate with a scenario, a person grocery shopping in a store may proceed through the checkout lane and pay for his/her groceries with a credit card. The vehicle 2 and/or system 4 can detect the occurrence of the credit card transaction, which can thereby indicate that the person 1 is done grocery shopping and about to leave the store. Accordingly, in response to the credit card transaction, the vehicle 2 can move towards the person, move to the location where the vehicle 2 dropped the person 1 off, move to a predetermined location, move to a location of the person's remote computing device 12 (which can indicate the location of the person 1), or move to any other location to thereby pick up the person 1.

Because so many people carry remote computing devices, such as smartphones, the system 4 can monitor and respond to various events associated with remote computing devices. For example, in some embodiments where the person 1 has a remote computing device 12, in response to the electronic payment transaction for a purchase of the item at the store, the system 4 can receive the checkout notification 6b, such as a first checkout notification 6b. It should be appreciated that the electronic payment transaction can be a mobile payment and/or digital wallet service, such as Apple Pay (provided by Apple Inc.) that lets users make payments with their remote computing devices, which include smartphones, wearable devices, tablets, and the like. It should also be appreciated that the electronic payment transaction can include services like Android Pay (provided by Android, Inc.), Samsung Pay (provided by Samsung Electronics Co., Ltd.), and the like.

Embodiments of the system 4 can also be configured to determine whether the remote computing device 12 is located within a predetermined distance of the vehicle 2. In this regard, the first wireless communication 15a can prompt the vehicle 2 to move towards the person 1 having the remote computing device 12 in response to the remote computing device 12 being located within the predetermined distance. For example, the system 4 may determine that the person 1 was previously located with respect to the vehicle a distance greater than the predetermined distance, but the person 1 has now moved to within the predetermined distance of the vehicle. Accordingly, this can indicate that the person 1 is ready to be picked up by the vehicle 2. In response, the vehicle 2 can move towards the person 1 to pick up the person 1. It should be appreciated that the predetermined distance can be any distance preset by the vehicle manufacturer, vehicle owner, vehicle operator, and anyone affiliated with the vehicle 2 and/or system 4. Additionally, the predetermined distance can be any distance such as 10 feet, 100 feet, 1,000 feet, 1 mile, and any distance greater than 1 mile.

The system 4 can also be configured to send various wireless communications to the vehicle 2 in response to the location of the remote computing device 12. In some embodiments, if the remote computing device 12 is not located within the predetermined distance of the vehicle 2, the system 4 can send a second wireless communication 15b to the remote computing device 12. However, in some embodiments, if the remote computing device 12 is located within the predetermined distance of the vehicle 2, the system 4 can send the second wireless communication 15b to the remote computing device 12. The second wireless communication 15b can prompt the remote computing device 12 to ask the person 1 whether the person 1 wants the vehicle 2 to move towards the person 1. To better illustrate with a real-life scenario, if the person 1 is shopping at a large shopping mall, the system 4 may determine that the remote computing device 12 (and the person 1) is located greater than 2,000 feet away from the vehicle 2, perhaps at the other end of the shopping mall. In response to this determination, the system 4 may then send the second wireless communication 15b to the remote computing device 12 to determine if the person 1 wants to get picked up at the other end of the shopping mall or if the person does not want to get picked up, because he/she wants to continue shopping.

As illustrated in FIGS. 2 and 3, the system 4 can also be configured to receive a third wireless communication 15c in response to the system 4 sending the second wireless communication 15b and/or the remote computing device 12 receiving the second wireless communication 15b. Stated differently, the remote computing device 12 can be configured to send the third wireless communication 15b in response to the system 4 sending the second wireless communication 15b and/or the remote computing device 12 receiving the second wireless communication 15b. Accordingly, in some embodiments, the system 4 can receive the third wireless communication 15c from the remote computing device 12. The third wireless communication 15c can include various instructions, such as first instructions to maintain the vehicle 2 in a parked state, second instructions to move the vehicle 2 towards the person 1, third instructions to put the vehicle 2 in a holding pattern mode whereby the vehicle 2 drives around a portion of a parking lot or roadway waiting for the person 1 to be ready to be picked up, and the like.

Furthermore, the third wireless communication 15c can include instructions to perform actions for a predetermined amount of time, or an amount of time until the system 4 receives a subsequent notification. For example, the third wireless communication 15c can include instructions to maintain the vehicle 2 in a parked state for a predetermined amount of time or maintain the holding pattern until the system 4 receives a subsequent notification indicating the person 1 is ready to be picked up. Once the predetermined amount of time has elapsed, the vehicle 2 can perform subsequent actions, such as any of the actions described in this disclosure, including moving towards the person 1.

Embodiments can also include communications between the person 1 and vehicle 2 and/or system 4 whereby the person 1 can provide specific location data 14 to the system 4 so that the vehicle 2 can pick up the person 1 at a desired location. For example, in some embodiments, in response to the system 4 receiving the third wireless communication 15c, the system 4 can send a fourth wireless communication 15d to the remote computing device 12. The fourth wireless communication 15d can prompt the remote computing device 12 to ask the person 1 where the person 1 wants to meet the vehicle 2. The system 4 can then receive desired location data for where the person 1 wants to meet the vehicle 2. This configuration can provide user convenience for instances when portions of the roadway are congested with traffic. Accordingly, the person 1 (i.e. user) can thereby summons the vehicle to a new desired location with less traffic.

Figure 4:
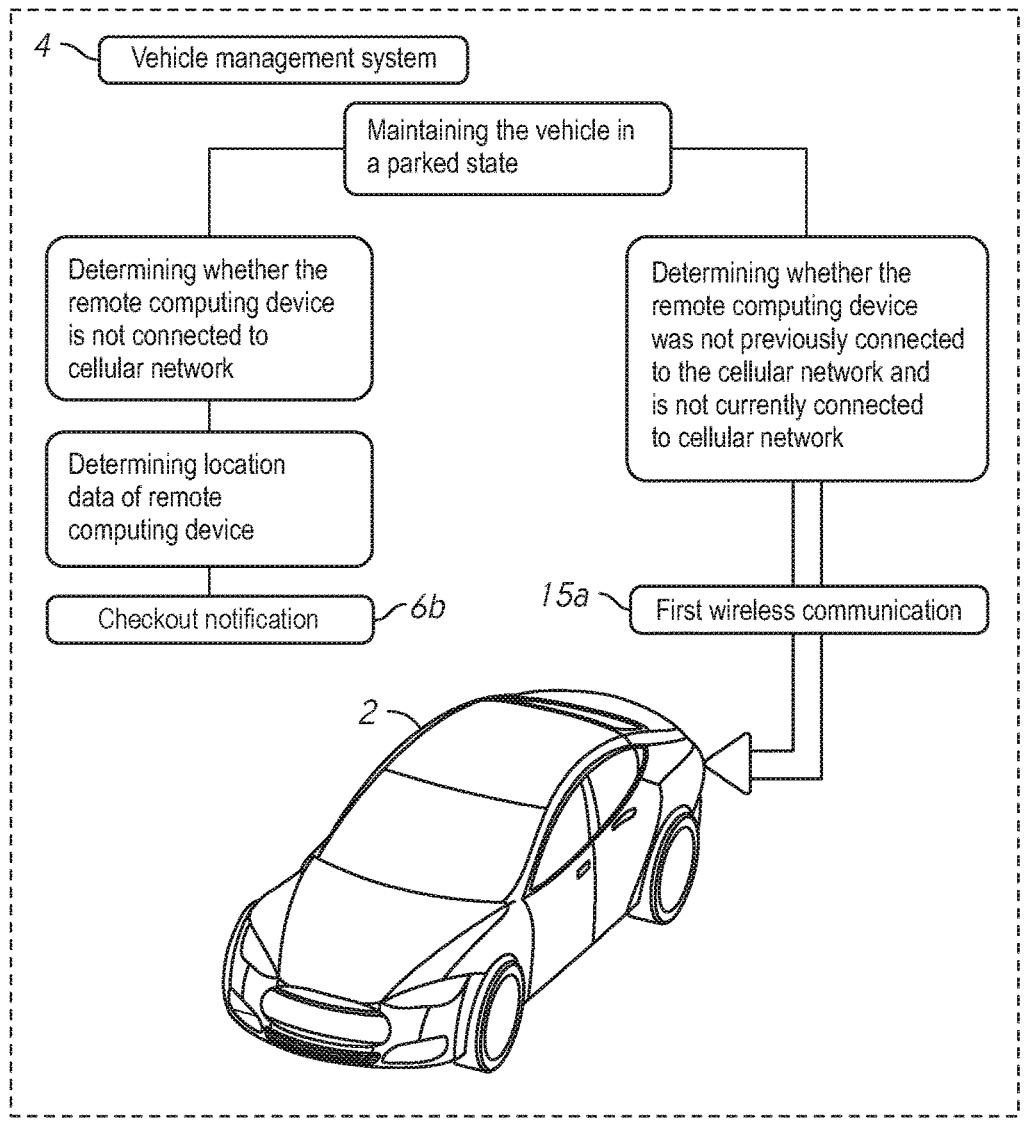
FIG. 4 illustrates a diagrammatic view of another method of using a self-driving vehicle, according to some embodiments.
Figure 4:
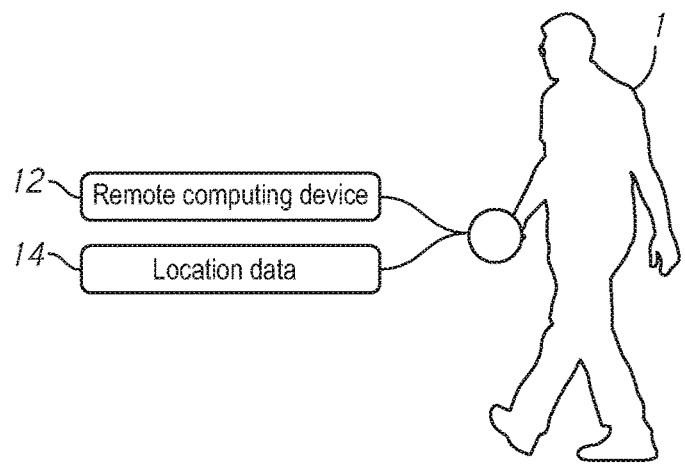

The system 4 can also be configured to perform advanced steps to more accurately determine not only whether the person 1 is in need of a ride from the vehicle 2, but also the location of the remote computing device 12 and/or person 1. With reference to FIGS. 3 and 4, in some embodiments, the system 4 can determine the connectivity of the remote computing device 12 and thereby perform actions with the vehicle 2 in response to the connectivity of the remote computing device 12. In some embodiments, in response to receiving a notification of an occurrence of an event, such as the checkout notification 6b, the system 4 can then determine whether the remote computing device 12 is connected to a cellular network and/or a wireless network. In response to determining the remote computing device 12 is not connected to the cellular network, the system 4 can maintain the vehicle 2 in a parked state. Described in further detail, the system 4 may detect that the person has purchased an item from a store, and the system 4 may perform additional verifications to determine whether the person 1 is actually leaving the store. As such, in response to the checkout notification 6b, the system 4 may determine that the remote computing device 12 is not connected to the cellular network, which may indicate that the person and the remote computing device 12 are still located inside the store. The system 4 may determine that the remote computing device 12 is instead connected to the wireless network (perhaps the wireless network operated by the store), which may further indicate that the person is still inside the store and not yet ready to leave. Embodiments of the system 4 may be configured to respond to these determinations in any number of ways, such as moving the vehicle 2 towards the person 1, maintaining the vehicle 2 in a parked state, and the like.

The system 4 may also perform additional steps to determine whether the person 1 is ready to be picked up by the vehicle 2. In some embodiments, the system 4 may determine whether the remote computing device 12 was previously not connected to the cellular network and then determine whether the remote computing device 12 is subsequently connected to the cellular network. Additionally, in some embodiments, the system 4 may send the first wireless communication 15a to the vehicle 2 in response to determining that the remote computing device 12 was previously not connected to the cellular network and then determining whether the remote computing device is subsequently connected to the cellular network. This sequence may indicate that the person 1 was located inside a building where their remote computing device 12 was unable to receive a signal, and then the person 1 moved near the exit of the building or even outside the building whereby their remote computing device 12 was able to receive a signal. This may indicate that the person 1 needs to be picked up by the vehicle 2.

Figure 5:
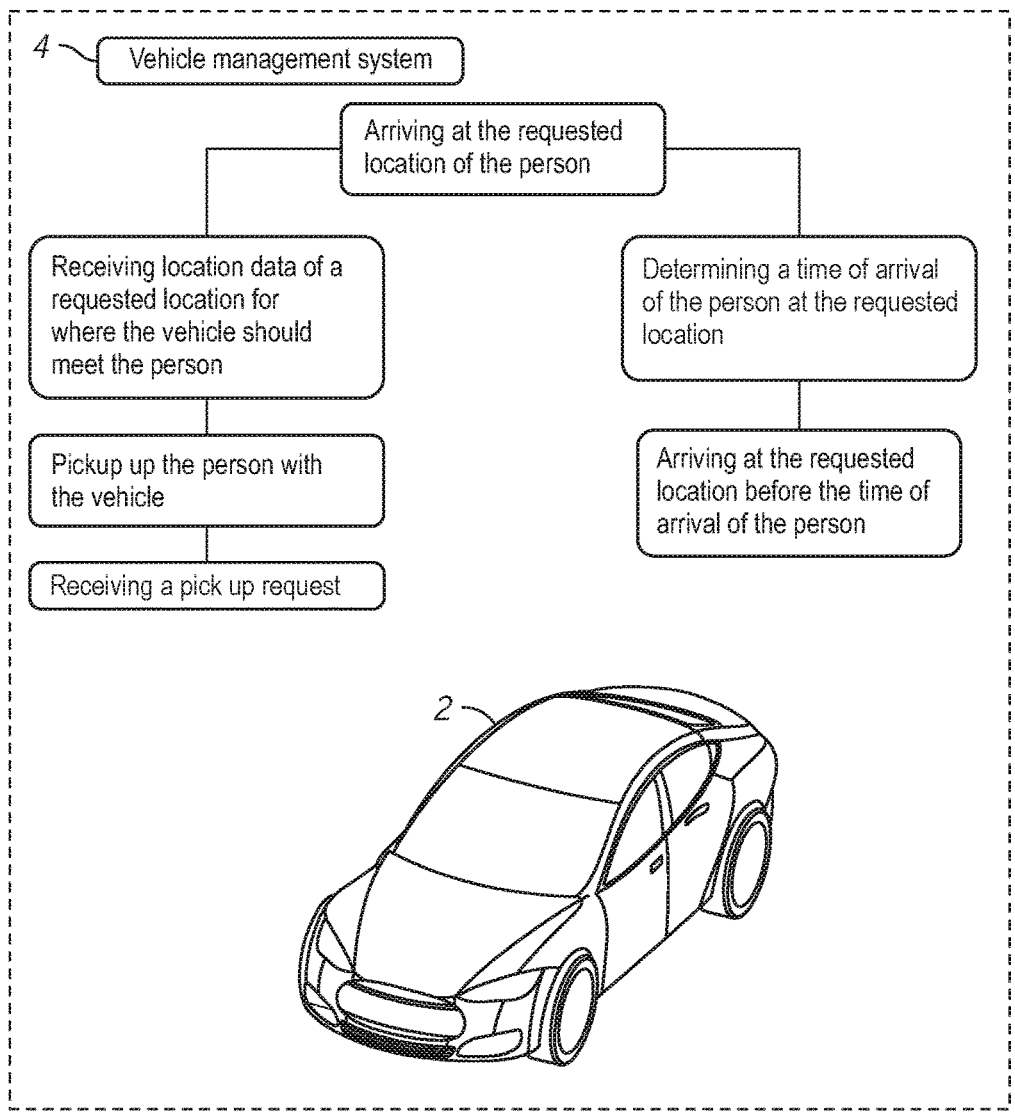
FIG. 5 illustrates a diagrammatic view of another method of using a self-driving vehicle, according to some embodiments.
Figure 5:
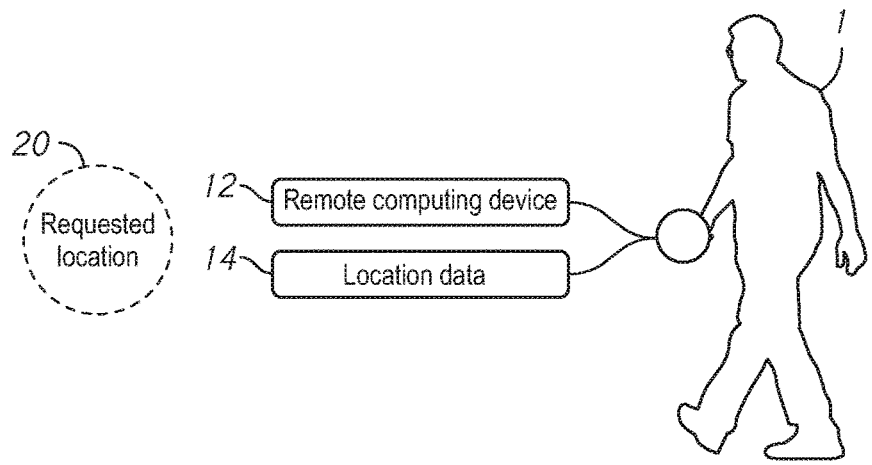

The system 4 may also be configured to receive manual summons requests from the person 1, whereby the summons request can indicate that the person 1 would like to be picked up by the vehicle 2. As illustrated in FIG. 5, in some embodiments, the system 4 may receive a pickup request 6d for the vehicle 2 to pick up the person 1. Accordingly, the vehicle 2 may move towards the person 1 and/or pick up the person 1. It should be appreciated that the person 1 may manually summons the vehicle 2 by submitting a request through their remote computing device 12, which can be received by the system 4.

The system 4 can also be configured to search for location data 14 of the remote computing device 12. In some embodiments, searching for the location data 14 occurs in response to various other events or notifications 6a, such as the electronic payment transaction. In this regard, the system 4 can determine the location of the remote computing device 12, and because the person 1 likely has the remote computing device 12 close by, or coupled to their person, the location data 14 can thereby indicate the location of the person 1. Accordingly, the system 4 can also be configured to send the location data 14 of the remote computing device 12 to the vehicle 2. The location data 14 can thereby allow the vehicle 2 to drive towards the location of the remote computing device 12, to thereby retrieve the person 1.

As illustrated in FIG. 5, some embodiments of the system 4 can also receive a requested pickup location that indicates where the person 1 would like to be picked up by the vehicle 2. In this manner, the person 1 may request the pickup location in a number of ways. In some embodiments, the person 1 sends a text message, via the remote computing device 12, which includes location data, such as a street address, to the system 4. The text message can thereby instruct the vehicle 2 to pick up the person at a requested location 20. In some embodiments, the person 1 drops a pin on a map displayed on the screen of the remote computing device 12 to indicate the location where the person 1 would like to be picked up. Once the system 4 receives the requested location 20, the vehicle 2 can thereby travel towards the requested location 20 of the person 1. The system 4 can also be configured to recognize frequently visited, or known locations, such as home, work, and the like.

With continued reference to FIG. 5, the system 4 may also perform additional steps to precisely coordinate the arrival time of the person 1 at the requested location 20 with the arrival time of the vehicle 2 at the requested location 20. Accordingly, the system 4 may determine a time of arrival of the person at the requested location 20. In some embodiments, the vehicle 2 may arrive at the requested location 20 at approximately the time of arrival of the person. In other words, the person 1 and the vehicle 2 arrive at the requested location 20 at approximately the same time. In some embodiments, the vehicle 2 may arrive at the requested location 20 before the time of arrival of the person 1. Even still, in some embodiments, the vehicle 2 may arrive at the requested location 20 after the time of arrival of the person. It should be appreciated the term "approximately" may be defined as arriving within plus or minus 5 minutes. In other words, the person 1 and the vehicle 2 may arrive at the requested location 20 within 5 minutes of each other.

Figure 6:
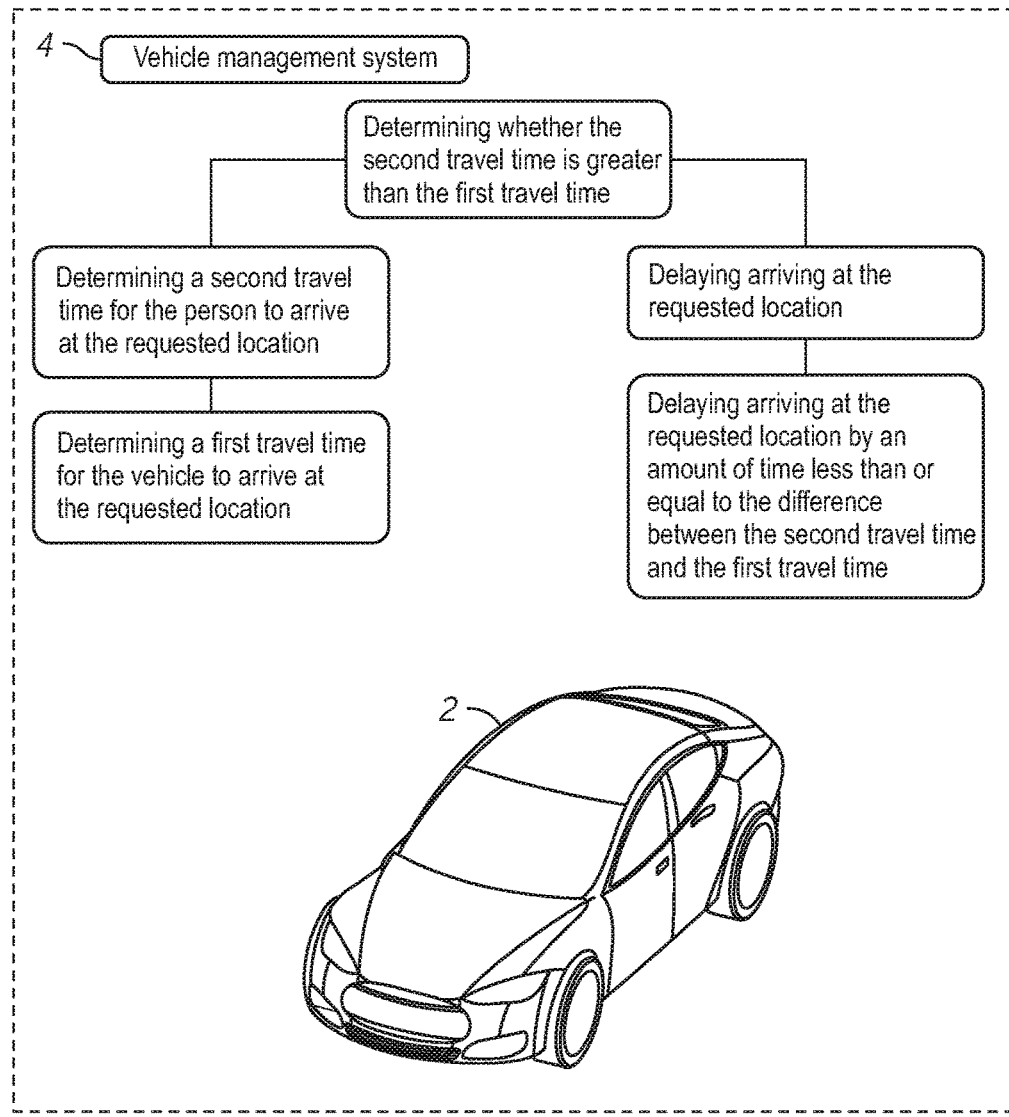
FIG. 6 illustrates a diagrammatic view of another method of using a self-driving vehicle, according to some embodiments.
Figure 6:
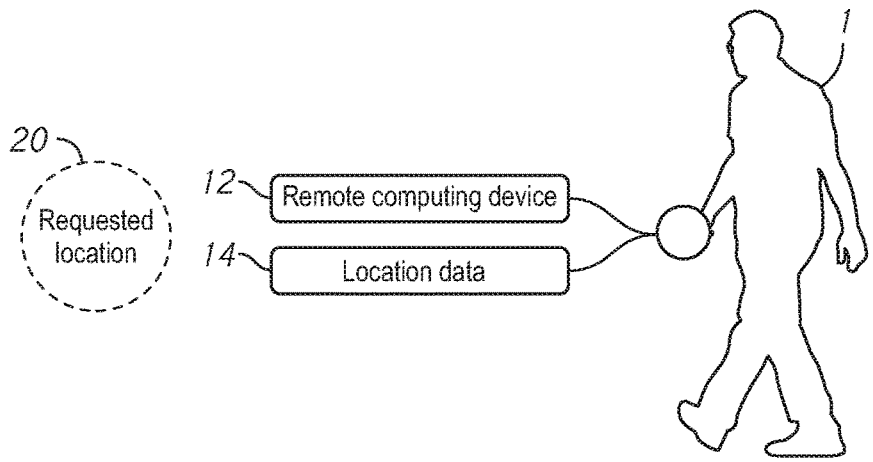

The system 4 may even determine travel times for the person 1 and vehicle 2 to the requested location 20 and thereby coordinate the departure of the vehicle 2 so that it corresponds with the arrival of the person 1. As illustrated in FIG. 6, the system 4 may determine a first travel time for the vehicle 2 to arrive at the requested location 20. The system 4 may also determine a second travel time for the person 1 to arrive at the requested location 20. The system 4 may then determine whether the second travel time is greater than the first travel time, or whether the second travel time is equal to or less than the first travel time. In response to the system 4 determining that the second travel time is greater than the first travel time, the system 4 may delay the vehicle's departure by an amount of time so that the vehicle arrives at the requested location 20 at approximately the same time as the person 1. In other words, the system 4 can delay the vehicle 4 arriving at the requested location 20 in response to determining the second travel time is greater than the first travel time. In some embodiments, delaying arriving at the requested location 20 can include delaying arriving at the requested location 20 by an amount of time less than or equal to the difference between the second travel time and the first travel time. In response to the system 4 determining that the second travel time is equal to or less than the first travel time, the system 4 may immediately dispatch the vehicle 2 so that the vehicle 2 arrives at the requested location 20 as close as possible to the arrival time of the person 1. In the event that the second travel time is less than the first travel time, the system 4 may send a notification to the remote computing device 12 to thereby notify the person 1 that the vehicle 2 will arrive later then the person 1.

Figure 7:
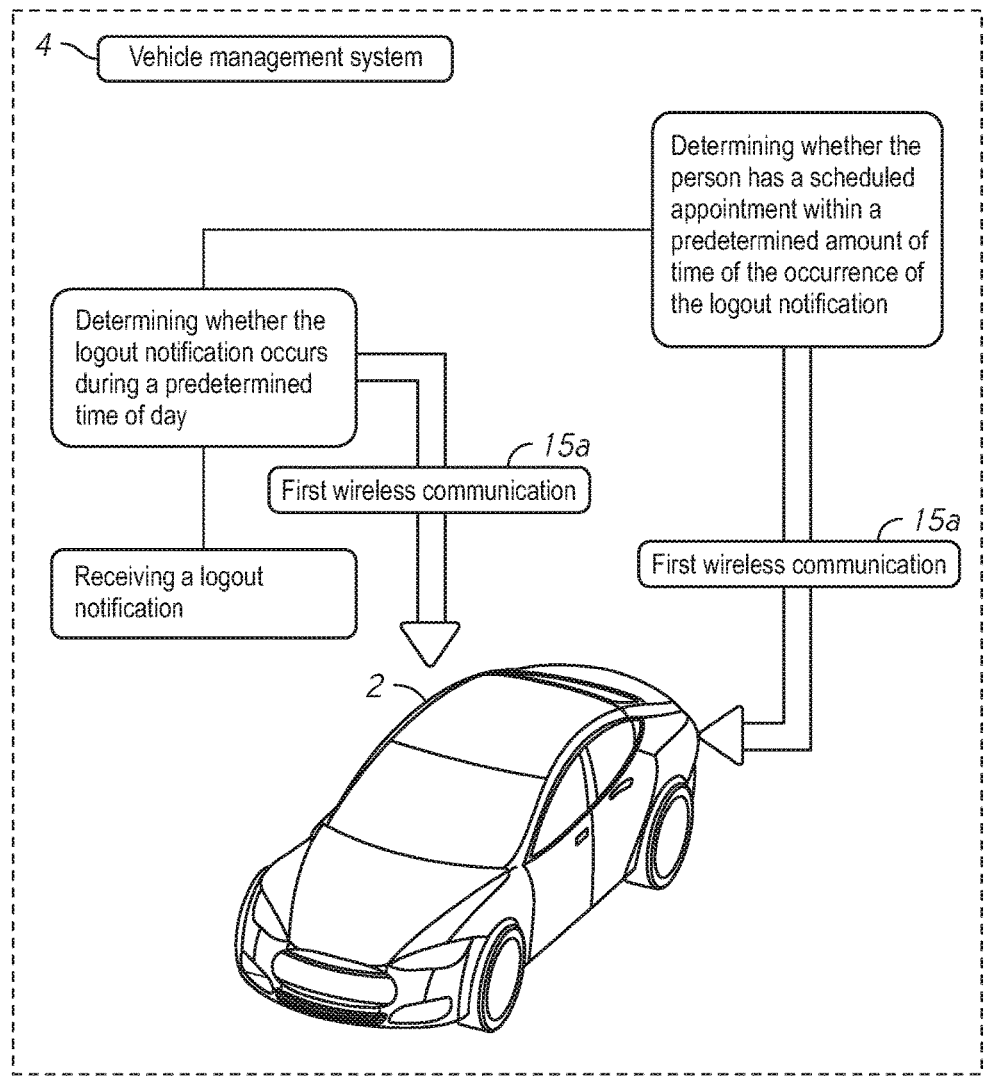
FIG. 7 illustrates a diagrammatic view of another method of using a self-driving vehicle, according to some embodiments.
Figure 7:
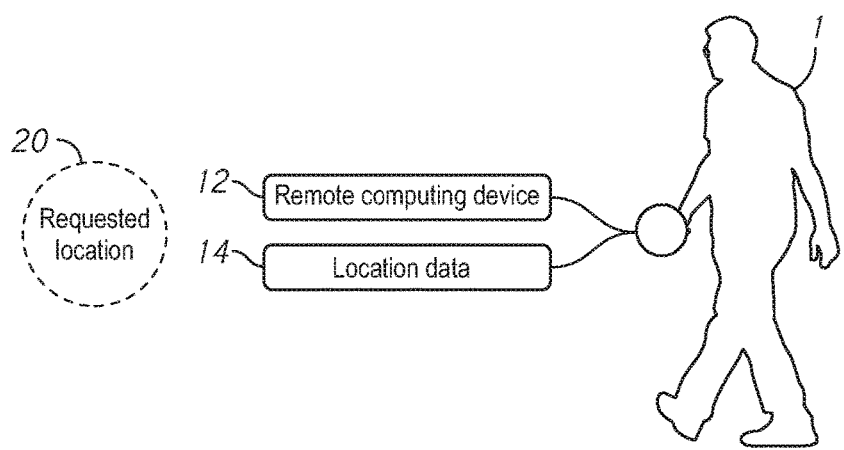

This disclosure also includes embodiments configured to monitor a person's computer activity and then pick up the person 1 in response to the activity. Specifically, these embodiments can be useful during the workday while the person 1 is at work. Accordingly, the notification 6a can include various computer notifications, such as a logout notification 6e whereby the person 1 logs out of a computer, such as a work computer. As shown in FIG. 7, the system 4 can receive the logout notification 6e in response to the person logging out of a computer. The logout notification 6e can indicate that the person 1 is leaving work for the day and the person 1 needs to be picked up by the vehicle 2. In response to the system 4 receiving the logout notification 6e, the vehicle 2 can then move towards a location to pick up the person 1.

People often logout out of their computers at various times during the middle of the workday but don't intend to leave work. Rather, the person may log out for various activities that commonly occur during the workday and/or occur onsite at the office, such as meetings, bathroom breaks, coffee breaks, and the like. In some embodiments, the system 4 may determine that the logout notification 6e occurs during a predetermined time of day. Accordingly, the system 4 may send the first wireless communication 15a to the vehicle 2 in response to receiving the logout notification 6e and the logout notification 6e occurring during the predetermined time of day. In other words, the system 4 can be configured to pick up or not pick up the person in response to the logout notification 6e. For example, if the logout notification 6e occurs during a predetermined time of day, such as during working hours (e.g. 9 am to 5 pm), then the system 4 may not instruct the vehicle 2 to pick up the person 1. Whereas, if the logout notification 6e occurs during a second predetermined time of day, such as after 5 pm, then the system 4 may instruct the vehicle 2 to pick up the person 1 because this time is after the person's workday has ended.

However, there are exceptions to this criteria, such as if the logout notification 6e occurs during lunch hours (e.g. 11 am to 1 pm). Accordingly, in response to the logout notification occurring during lunch hours, the vehicle 2 may move towards the person 1 to pick up the person 1 and take them to a restaurant or to an offsite appointment.

Additionally, the system 4 may be configured to determine if the logout notification 6e occurs within a predetermined amount of time of a scheduled appointment. The system 4 may further determine the location of the scheduled appointment. For example, if the system 4 determines that the scheduled appointment is located offsite (i.e. located remotely to the person's work), and the system 4 determines that the scheduled appointment occurs within a predetermined amount of time of the occurrence of the logout notification 6e, then the system 4 may instruct the vehicle 2 to move towards the person 1 to pick him or her up. Furthermore, if the system 4 determines that the scheduled appointment is located onsite (i.e. the appointment is located in the same building as the person's work or within a very short distance, such as 500 feet away), and the system 4 determines that the scheduled appointment occurs within a predetermined amount of time of the occurrence of the logout notification 6e, then the system 4 may not instruct the vehicle 2 to move towards the person 1 to pick him or her up.

Systems and methods may also be configured to determine the signal strength of the remote computing device 12, which may further indicate the person's location and need for a ride from the vehicle 2. In some embodiments, the system 4 is configured to determine whether a remote computing device 12 associated with the person 1 is disconnected from the cellular network or connected to the cellular network, but with a first signal that is less than a predetermined level. The system 4 can then determine whether the remote computing device 12 is connected to the cellular network with a second signal greater than or equal to the predetermined level. If the system determines that the remote computing device 12 is connected to the cellular network with the first signal that is less (weaker) than the predetermined level, then this may indicate that the person 1 was previously inside the building (e.g. the store) and their remote computing device 12 was receiving no signal or a weak signal. The subsequent determination that the remote computing device 12 is connected to the cellular network with the second signal strength that is greater than or equal to the predetermined level may indicate that the person 1 is outside the building or closer to the exit of the building whereby their remote computing device 12 is receiving a stronger signal. These determinations taken in sequence may indicate that the person 1 is thereby moving toward the exit and in need of a ride from the vehicle 2. In response to one or both of these determinations, the system 4 may send a first wireless communication to the vehicle 2. In some embodiments, the predetermined threshold is equal to the first signal. In some embodiments, the predetermined threshold is equal to the second signal. It should be appreciated that stating that a signal is greater than, less than, or equal to a predetermined level is referring to the strength of the signal.

Figure 8:
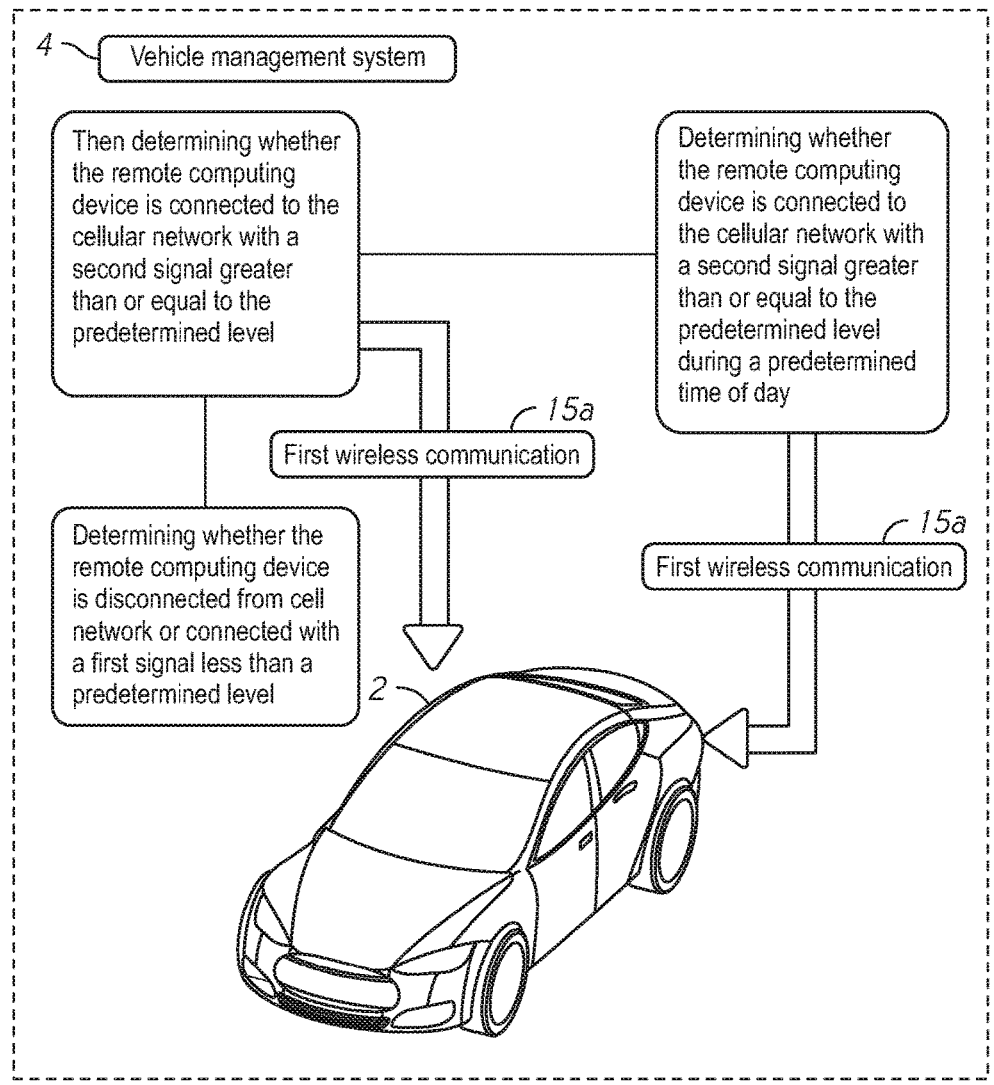
FIG. 8 illustrates a diagrammatic view of another method of using a self-driving vehicle, according to some embodiments.
Figure 8:
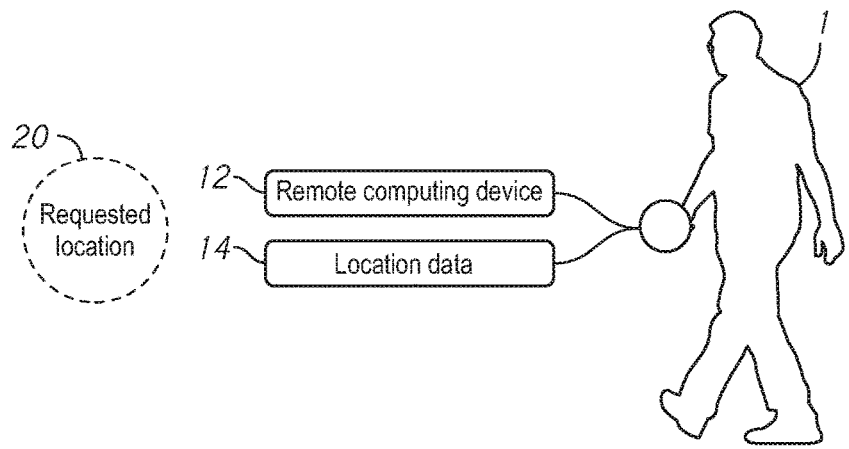

The system 4 may also be configured to further determine the person's need for a ride from the vehicle 2 by tracking the signal strength of the remote computing device 12 at predetermined times of day. As shown in FIG. 8, in some embodiments, the system 4 may determine whether the remote computing device 12 is connected to the cellular network with a second signal greater than or equal to the predetermined level during a predetermined time of day. In this regard, the system 4 may determine that the remote computing device 12 is connected to the cellular network with a second signal greater than the predetermined threshold. However, determining signal strength alone may not provide enough information for the system 4 to accurately conclude whether the person 1 needs a ride from the vehicle 2.

In this regard, the determination of the second signal strength can be further augmented by the system 4 determining if the second signal occurs during a specific time of day, such as between 10 am and 6 pm, or after 6 pm. For example, if the system 4 determines that the second signal is greater than the predetermined threshold at 2 pm, then this might indicate that the person 1 is outside of the building or near the entrance but is not actually leaving the building. For example, the person 1 might be taking a short walk break outside the building whereby the remote computing device 12 receives a stronger signal as compared to when the remote computing device 12 is inside the building. On the other hand, if the system 4 determines that the second signal is greater than the predetermined threshold at 7 pm, then this might indicate that the person 1 is near the entrance or physically outside the building, but more importantly, this determination might indicate that the person 1 is leaving work. In response to this determination, the vehicle 2 can begin moving towards the person 1 to pick the person 1 up.

Figure 9:
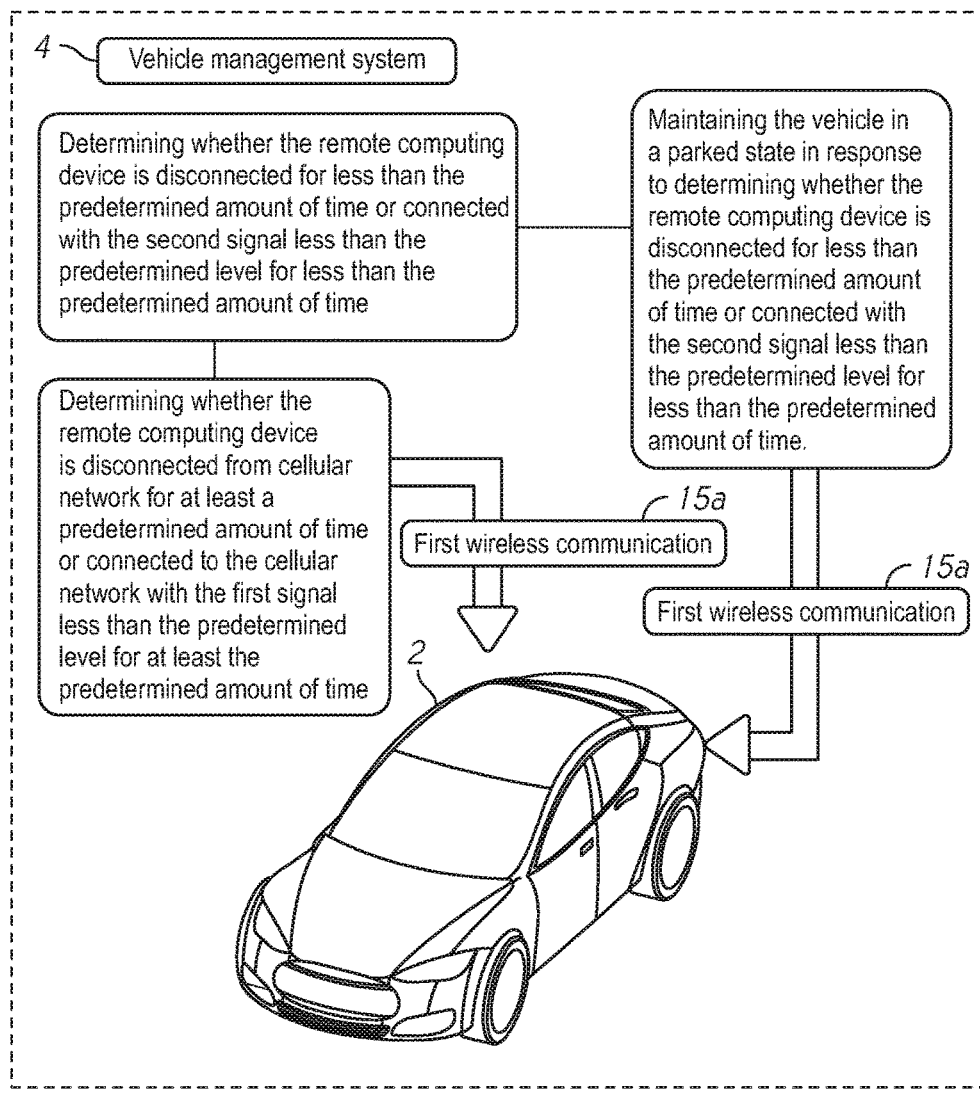
FIG. 9 illustrates a diagrammatic view of another method of using a self-driving vehicle, according to some embodiments.
Figure 9:
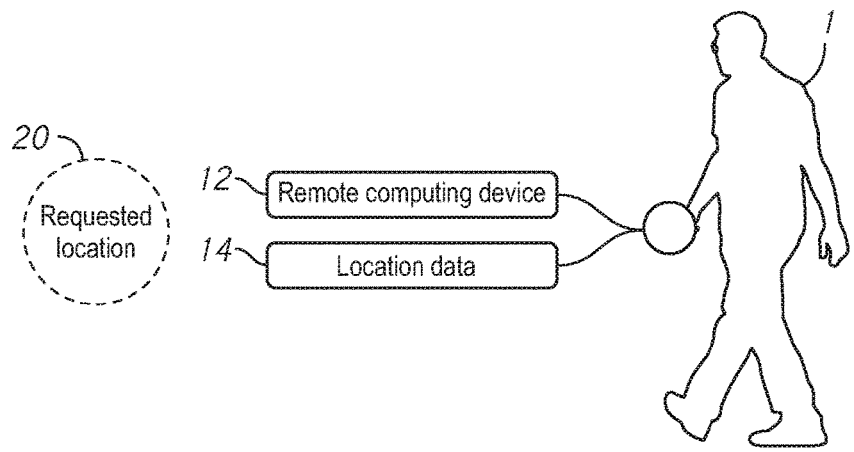

In addition to determining the signal strength of the remote computing device 12 during predetermined times of day, the system 4 may also be configured to determine how long the remote computing device 12 is receiving a signal with a strength greater than or less than the predetermined threshold. As shown in FIG. 9, the system 4 can be configured to determine whether the remote computing device 12 is disconnected from the cellular network for at least a predetermined amount of time or connected to the cellular network with the first signal less than the predetermined level for at least the predetermined amount of time.

In this regard, the system 4 can send the first wireless communication to the vehicle 2 in response to determining whether the remote computing device 12 is disconnected from the cellular network for at least a predetermined amount of time or connected to the cellular network with the first signal less than the predetermined level for at least the predetermined amount of time. To further illustrate with an example, the person 1 may be moving between areas of the building where the cellular signal or Wi-Fi signal of the remote computing device 12 is impaired. For example, the person 1 might be in an elevator whereby the remote computing device 12 receives a diminished signal or no signal at all. Furthermore, depending upon which floor the person 1 is going to, the system 4 may determine the amount of time that the remote computing device 12 receives the diminished signal and then interpret this differently.

For example, a person 1 may have an office on the $40^{th}$ floor so when the person 1 leaves the office for the day, the person 1 likely has to take the elevator to the $1^{st}$ floor. Accordingly, the system 4 can determine how long it commonly takes to travel from the $40^{th}$ floor to the $1^{st}$ floor (plus-minus additional time depending on whether the elevator has to pick up or drop off other passengers). Accordingly, in some instances, the person 1 might travel from the $40^{th}$ floor to another floor within the building (e.g. the $25^{th}$ floor). In this regard, the system 4 may determine that the remote computing device 12 received a diminished signal for an amount of time less than the amount it takes to travel from the $40^{th}$ floor to the $1^{st}$ floor. As such, the system 4 may interpret this to mean that the person 1 is not leaving the building and is instead simply moving between floors in the building, without intending to leave the office. Therefore, the system 4 may maintain the vehicle 2 in a parked state in response to determining that the remote computing device 12 is disconnected from the cellular network (or connected to the cellular network with the second signal less than the predetermined level) for less than the predetermined amount of time. In some embodiments, the predetermined amount of time may be the amount of time it commonly takes for the person 1 to travel by elevator from their work floor to the ground level.

Generally, it should be appreciated that the system 4 can learn the person's day-to-day behavioral patterns and the system 4 can adapt its responses accordingly. Because machine learning can require more than one data point, the system 4 can also be configured to receive manual inputs from a user, such as the person 1. For example, if the person 1 relocates their desk from the $40^{th}$ floor to the $25^{th}$ floor, the system 4 may be configured to receive a manual input whereby the person 1 can override the previous learning of the system 4. In this regard, the system 4 can be fully configured to automatically learn and adjust to a person's behavior, as well as be manually configured to a specific setting as dictated by the user.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of picking up a person with a self-driving vehicle, the method comprising:

receiving, by a vehicle management system, a logout notification comprising a notification that the person has logged out of a computer located remotely relative to the self-driving vehicle, wherein the logout notification occurs before the self-driving vehicle picks up the person;

sending, by the vehicle management system, a first wireless communication to the self-driving vehicle in response to receiving the logout notification; and prompting the self-driving vehicle to move towards the person and pick up the person.

2. The method of claim 1, wherein prompting the self-driving vehicle to move towards the person and pick up the person occurs at least partially in response to receiving the first wireless communication, and wherein the person has a remote computing device, the method further comprising searching, by the vehicle management system, for location data of the remote computing device in response to the logout notification.

3. The method of claim 2, further comprising sending, by the vehicle management system, the location data of the remote computing device to the self-driving vehicle.

4. The method of claim 2, further comprising determining, by the vehicle management system, whether the remote computing device is located within a predetermined distance of the self-driving vehicle, wherein the first wireless communication prompts the self-driving vehicle to move towards the person having the remote computing device in response to the remote computing device being located within the predetermined distance.

5. The method of claim 4, further comprising sending, by the vehicle management system in response to the remote computing device not being located within the predetermined distance of the self-driving vehicle, a second wireless communication to the remote computing device, wherein the second wireless communication prompts the remote computing device to determine whether the person wants the self-driving vehicle to move towards the person.

6. A system for picking up a person with a self-driving vehicle, the system comprising:

a vehicle management system configured to receive logout notifications and send wireless communications;

a logout notification received by the vehicle management system in response to the person logging out of a computer located remotely relative to the self-driving vehicle, wherein the vehicle management system is configured to receive the logout notification before the self-driving vehicle picks up the person; and a first wireless communication sent by the vehicle management system to the self-driving vehicle in response to receiving the logout notification, wherein the first wireless communication is configured to prompt the self-driving vehicle to move towards the person and pick up the person.

7. The system of claim 6, wherein the vehicle management system is located onboard the self-driving vehicle.

8. The system of claim 6, wherein the vehicle management system is remotely located with respect to the self-driving vehicle.

9. The system of claim 6, further comprising a remote computing device communicatively coupled to the vehicle management system and operated by the person.

10. The system of claim 9, wherein the vehicle management system is configured to receive location data of the remote computing device.

11. The system of claim 9, further comprising a second wireless communication received by the remote computing device, wherein the second wireless communication prompts the remote computing device to determine whether the person wants the self-driving vehicle to move towards the person.

12. The system of claim 11, further comprising a third wireless communication received by the vehicle management system, wherein the third wireless communication comprises at least one of a first instruction to position the self-driving vehicle in a parked state and a second instruction to move the self-driving vehicle towards the person.

13. A method of picking up a person with a self-driving vehicle, the method comprising:

receiving, by a vehicle management system, an indication that the person has requested a ride from the self-driving vehicle, wherein the indication comprises a logout notification that the person has logged out of a computer located remotely relative to the self-driving vehicle;

determining, by the vehicle management system, that the person has a scheduled appointment within a predetermined amount of time of the occurrence of the indication;

sending, by the vehicle management system, a first wireless communication to the self-driving vehicle in response to determining that the scheduled appointment occurs within the predetermined amount of time of the occurrence of the indication, wherein the first wireless communication prompts the self-driving vehicle to move towards the person; and receiving, by the vehicle management system, the logout notification, wherein the logout notification occurs before the self-driving vehicle picks up the person.

14. The method of claim 13, further comprising:

determining, by the vehicle management system, that a location of the scheduled appointment is located less than a predetermined distance from the computer; and sending, by the vehicle management system, a second wireless communication to the self-driving vehicle in response to determining that the location of the scheduled appointment is located less than the predetermined distance from the computer, wherein the second wireless communication prompts the self-driving vehicle to perform at least one of move away from the person, not pick up the person, and position the self-driving vehicle in a parked state.

15. The method of claim 13, further comprising determining, by the vehicle management system, that a location of the scheduled appointment is located greater than a predetermined distance from the computer, wherein sending, by the vehicle management system, the first wireless communication to the self-driving vehicle also occurs in response to determining that the location of the scheduled appointment is located greater than a predetermined distance from the computer.

16. The method of claim 13, further comprising receiving, by the vehicle management system, a second wireless communication from a remote computing device associated with the person, wherein the second wireless communication comprises instructions to perform at least one of move away from the person, not pick up the person, and position the self-driving vehicle in a parked state.

17. The method of claim 13, further comprising:

receiving, by the vehicle management system, location data of a remote computing device associated with the person; and arriving, by the self-driving vehicle, at a requested location of the person.

18. The method of claim 17, further comprising:
- determining, by the vehicle management system, a time of arrival of the person at the requested location; and
- arriving, by the self-driving vehicle, at the requested location before the time of arrival of the person.

19. The method of claim 13, further comprising determining, by the vehicle management system, that the indication occurs during a predetermined time of day, wherein sending, by the vehicle management system, the first wireless communication to the self-driving vehicle occurs in response to receiving the indication and the indication occurring during the predetermined time of day.

20. The method of claim 13, further comprising posting, by the vehicle management system, a status on a social network.

\* \* \* \* \*